United States Patent
Niehsen et al.

(10) Patent No.: US 9,605,971 B2
(45) Date of Patent: Mar. 28, 2017

(54) METHOD AND DEVICE FOR ASSISTING A DRIVER IN LANE GUIDANCE OF A VEHICLE ON A ROADWAY

(75) Inventors: Wolfgang Niehsen, Bad Salzdetfurth (DE); Stephan Simon, Sibbesse (DE)

(73) Assignee: ROBERT BOSCH GMBH, Stuttgart (DE)

( * ) Notice: Subject to any disclaimer, the term of this patent is extended or adjusted under 35 U.S.C. 154(b) by 109 days.

(21) Appl. No.: 14/126,230

(22) PCT Filed: Jun. 15, 2012

(86) PCT No.: PCT/EP2012/061500
§ 371 (c)(1),
(2), (4) Date: Mar. 14, 2014

(87) PCT Pub. No.: WO2012/172077
PCT Pub. Date: Dec. 20, 2012

(65) Prior Publication Data
US 2014/0176350 A1 Jun. 26, 2014

(30) Foreign Application Priority Data

Jun. 17, 2011 (DE) .................. 10 2011 077 752
Jun. 15, 2012 (DE) .................. 10 2012 210 145

(51) Int. Cl.
*B60W 30/16* (2012.01)
*G01C 21/36* (2006.01)
(Continued)

(52) U.S. Cl.
CPC .......... *G01C 21/3658* (2013.01); *B60K 35/00* (2013.01); *B60Q 9/008* (2013.01);
(Continued)

(58) Field of Classification Search
CPC ............ G01C 21/3658; G01C 21/3614; G01C 21/3635; G06K 9/00805; B62D 15/025; B60W 30/12
(Continued)

(56) References Cited

U.S. PATENT DOCUMENTS 7,696,863 B2 * 4/2010 Lucas ................ B60K 31/0008
340/435
2001/0040505 A1 * 11/2001 Ishida ................ G01C 21/3697
340/435
(Continued)

FOREIGN PATENT DOCUMENTS

DE   10 2006 059 353   6/2008
DE   10 2008 003 666   7/2009
(Continued)

OTHER PUBLICATIONS

International Search Report for PCT/EP2012/061500, dated Sep. 21, 2012.

*Primary Examiner* — Steven Lim
*Assistant Examiner* — Mancil Littlejohn, Jr.
(74) *Attorney, Agent, or Firm* — Gerrard Messina (57) ABSTRACT

A method for assisting a driver in lane guidance of a vehicle on a roadway includes: displaying a recorded image to the driver on a display unit, which image represents the vehicle surroundings; reading in an operating signal input on a user interface by the driver; selecting an object contained in the image, using the operating signal; displaying a mark on the display unit, the mark being displayed in an area of the image which represents the object; using the object for determining at least one longitudinal control parameter for a driving route to be traveled by the vehicle in order to assist the driver in lane guidance.

12 Claims, 8 Drawing Sheets

(51) Int. Cl.
  *B62D 15/02* (2006.01)
  *B60Q 9/00* (2006.01)
  *G06K 9/00* (2006.01)
  *B60W 50/08* (2012.01)
  *B60K 35/00* (2006.01)
  *B60W 30/12* (2006.01)

(52) U.S. Cl.
  CPC ............ *B60W 30/12* (2013.01); *B60W 30/16* (2013.01); *B60W 50/085* (2013.01); *B62D 15/025* (2013.01); *G06K 9/00805* (2013.01); *B60K 2350/1084* (2013.01); *B60W 2420/42* (2013.01)

(58) Field of Classification Search
  USPC ........................................................ 340/988
  See application file for complete search history.

(56) References Cited

U.S. PATENT DOCUMENTS

| | | | |
|---|---|---|---|
| 2004/0178894 A1 | 9/2004 | Janssen | |
| 2005/0259003 A1 | 11/2005 | Wakamatsu | |
| 2005/0259033 A1* | 11/2005 | Levine | B60K 26/00 345/7 |
| 2005/0273263 A1 | 12/2005 | Egami et al. | |
| 2006/0047386 A1 | 3/2006 | Kanevsky et al. | |
| 2007/0106475 A1 | 5/2007 | Kondoh | |
| 2008/0055114 A1 | 3/2008 | Kim et al. | |
| 2008/0097699 A1 | 4/2008 | Ono | |
| 2008/0150709 A1 | 6/2008 | Yamamoto et al. | |
| 2008/0239078 A1* | 10/2008 | Mohr | G06T 7/0042 348/148 |
| 2008/0312834 A1 | 12/2008 | Noda et al. | |
| 2010/0114471 A1* | 5/2010 | Sugiyama | G01C 21/3664 701/532 |
| 2010/0222958 A1* | 9/2010 | Kobayashi | B60G 17/0195 701/31.4 |
| 2010/0268538 A1* | 10/2010 | Ryu | G10L 17/00 704/250 |

FOREIGN PATENT DOCUMENTS

| | | | | |
|---|---|---|---|---|
| DE | 10 2008 011 228 | 8/2009 | | |
| DE | 10 2008 021 186 | 10/2009 | | |
| DE | 10 2008 002 560 | 12/2009 | | |
| EP | 1 398 684 | 3/2004 | | |
| GB | 2 265 779 | 10/1993 | | |
| JP | GB 2265779 A * | 10/1993 | ............... B06R 1/00 | |
| JP | 2001 034 897 | 2/2001 | | |
| JP | 2002 046501 | 2/2002 | | |
| JP | 2003-131785 | 5/2003 | | |
| JP | 2004-199512 | 7/2004 | | |
| JP | 2006-248335 | 9/2006 | | |
| JP | 2007-216775 | 8/2007 | | |
| JP | 2009-026003 A | 2/2009 | | |

\* cited by examiner

METHOD AND DEVICE FOR ASSISTING A DRIVER IN LANE GUIDANCE OF A VEHICLE ON A ROADWAY

BACKGROUND OF THE INVENTION

1. Field of the Invention

The present invention relates to a method for assisting a driver in lane guidance of a vehicle on a roadway, a corresponding device, and a corresponding computer program product.

2. Description of the Related Art

Adaptive cruise control (ACC) systems control the distance from preceding vehicles, and have been on the market for almost ten years. They are usually based on a radar sensor, and in some more recent vehicles, also a LIDAR sensor. Recently, multiple sensors such as radar and video sensors are also being consolidated in order to improve and expand the ACC function, for example with regard to taking lane information into account, improving the object measurement in particular in the lateral direction, making an earlier response to a vehicle merging into and out of lanes, detecting open space and preventing collisions, or laterally extending the detection range.

Published German patent application document DE 10 2008 003 666 A1 relates to a method for controlling a driver assistance system using sensors for detecting the vehicle surroundings, and a device for intervening in vehicle electrical systems of the vehicle as a function of output signals of the sensors, the driver assistance system detecting at least the course of a lane being traveled by the vehicle and the position of the vehicle in relation to the lane, and guiding the vehicle on a trajectory. In this regard, the driver assistance system establishes the trajectory as a function of the driver intent.

All driver assistance systems known thus far share the common feature that they provide the driver with very little information concerning the object detection by the sensors.

BRIEF SUMMARY OF THE INVENTION

The present invention provides a method for assisting a driver in lane guidance of a vehicle on a roadway, the method having the following steps:
  displaying a read-in image to the driver on a display unit, the image having been recorded by a camera and representing the vehicle surroundings;
  reading in an operating signal entered on a user interface by the driver;
  selecting an object contained in the image, using the operating signal;
  displaying a mark on the display unit, the mark being displayed in an area of the image which represents the object; and
  using the object for determining at least one longitudinal control parameter for a driving route to be traveled by the vehicle in order to assist the driver in lane guidance of the vehicle on the roadway, in particular the at least one longitudinal control parameter including a distance from the object to be maintained by the vehicle, and/or a relative speed as the vehicle approaches the object.

Moreover, the present invention provides a device, in particular a navigation system, which is designed to carry out or implement the steps of the method according to the present invention in corresponding devices. The object of the present invention may also be quickly and efficiently achieved by this embodiment variant of the present invention in the form of a device.

In the present context, a device may be understood to mean an electrical device which processes sensor signals and outputs control signals as a function thereof. The device may have an interface which may have a hardware and/or software design. In a hardware design, the interfaces may, for example, be part of a so-called system ASIC which contains various functions of the device. However, it is also possible for the interfaces to be dedicated integrated circuits or to be composed, at least partially, of discrete components. In a software design, the interfaces may be software modules which are present, for example, on a microcontroller in addition to other software modules.

A computer program product is also advantageous which has program code which may be stored on a machine-readable carrier such as a semiconductor memory, a hard drive memory, or an optical memory, and which is used for carrying out the method according to one of the specific embodiments described above when the program is executed on a device which corresponds to a computer.

Assistance of a driver in lane guidance of a vehicle on a roadway is understood, for example, as automatic longitudinal control and/or transverse guidance with regard to the object, or also assistance in the form of acoustic and/or haptic and/or virtual signals to the driver which prompt braking, acceleration, or steering. A display unit may be understood to mean a screen, or also a device which projects objects onto the windshield. The vehicle surroundings may be understood to mean an external area around the vehicle, in particular a roadway ahead of the vehicle, which is recorded by the camera. A user interface may be understood to mean an interface which recognizes a manual, voice, or other input of a driver or another person in the vehicle which provides the operating signal in response. A mark may be understood to mean a marking object which is displayed on the display unit. The mark or the marking object may be superimposed on an area of the image in which the object which has been selected is also represented. A determination of a driving route to be traveled by the vehicle may be understood to mean an ascertainment of the trajectory which is to advantageously guide the vehicle, for example in order to follow the object on the shortest path or in the most convenient manner. A longitudinal control parameter may be understood to mean, for example, a distance from an object which the vehicle is to follow, or a speed, this speed representing a maximum speed which the vehicle is to maintain so that a collision with the object may be avoided. This longitudinal control parameter may then be used in a vehicle guidance assistance unit in order to generate a longitudinal guidance signal and output same to the driver in order to assist the driver in controlling the vehicle via this longitudinal guidance signal. A longitudinal guidance signal may be understood to mean a signal which indicates to the driver how large the distance or how high the speed is with respect to a possible collision of the vehicle with the object. For example, the longitudinal guidance signal may be represented in the form of a tachometer in which the risk of an imminent collision of the vehicle with the object is depicted. Alternatively or additionally, of course, the longitudinal guidance signal may also be used to automatically make a steering intervention and/or activate a brake in order to assist the driver of the vehicle.

The present invention is based on the finding that, by displaying the mark on the display unit and by using as well as determining a driving route to be traveled by the vehicle, the driver of the vehicle now visually obtains information in a very visually appealing and easily recognizable manner concerning which object the navigation device is using as the basis for determining the lane guidance. The driver may thus quickly recognize an error when, for example, an unwanted object is used for determining at least one longitudinal control parameter for a driving route to be traveled by the vehicle. For example, such a longitudinal control parameter may also relate to a speed at which the objects are moving. For example, if one vehicle is traveling slowly on the right on a roadway and another vehicle is traveling fast on the left on the (adjacent) roadway, the vehicle on the left may be selected due to the speed and the system may thus be notified that the driver does not intend to slow down and follow the vehicle on the right, but instead intends to drive at a high speed. In this way, irritation of the driver which may possibly cause hazardous situations in traffic due to distraction of the driver is avoided.

According to one particular specific embodiment of the present invention, an early recognition of objects from the image is advantageously carried out in the step of displaying the image, one of multiple objects recognized early being selected in the selection step, using the operating signal. An early recognition may be understood to mean a pre-evaluation in which the image is already examined before an object is selected, and multiple possible objects to be selected are already recognized or classified as such. Such a specific embodiment of the present invention offers the advantage that the selection and subsequent marking of the selected object may now take place more quickly, so that the driver needs a shorter time for directing his gaze at the display unit in order to recognize whether the correct object has been selected for determining the driving route.

According to another specific embodiment of the present invention, the image may be displayed on a touch-sensitive display of the display unit in the display step, and a recognized pressing on the touch-sensitive display is read in as the operating signal in the reading-in step. Such a specific embodiment of the present invention offers the advantage of a quick, precise, and reliable option for selecting an object by the driver which is to be used for determining the driving route to be traveled.

Alternatively, in the reading-in step the operating signal may be generated in response to a recognized gesture of the driver, in particular the driver pointing with his/her finger to a position. Such a specific embodiment of the present invention provides additional enhanced convenience for the driver, since during the input he no longer has to be concerned about whether he is also touching a touch-sensitive display at the correct location. In this regard, driver safety may also be increased, since the driver does not have to divert his attention from traffic for as long a time in order to make the appropriate input.

To also allow a precise selection of the desired object while traveling in the vehicle, the object from among those recognized in advance in the image is selected in the selection step which is closest to a position in the image that is represented by a recognized pressing on the touch-sensitive display. Such a function still provides the option for being able to reliably select the desired object, for example even when there is an imprecise input on the touch-sensitive display. Such an option is particularly advantageous, for example, when traveling on an uneven roadway or when the driver glances at the display unit only briefly while traveling at high speed on an expressway.

According to another specific embodiment of the present invention, it is particularly advantageous when a user interface is used in the reading-in step which generates the operating signal by evaluating a voice command by the driver of the vehicle. Such a specific embodiment of the present invention offers the advantage of input by the driver without, for example, the driver having to move his hand from vehicle control units such as the steering wheel or a gearshift lever. This increases traffic safety when the approach proposed here is used.

According to another specific embodiment of the present invention, in the step of selecting the object, an object is selected which represents another vehicle situated on the roadway ahead of or to the side of the host vehicle. Such a specific embodiment of the present invention offers the advantage of simple selection of a vehicle which is to be tracked using lane guidance assistance. In addition, another vehicle is also usually sufficiently large to be quickly selected by fingertip control on the one hand, or to be quickly recognized on the display unit on the other hand, so that the driver requires only a very short time to divert his gaze from traffic to the display unit.

In addition, according to another specific embodiment of the present invention, in the display step the mark may be displayed by a representation which varies over time. Such a specific embodiment of the present invention offers the advantage that the selected object may be recognized very quickly, even during an only cursory glance at the display unit. In addition, by varying the representation, additional information may be displayed, for example an indication of an imminent collision with the object being tracked. In this way traffic safety is likewise increased, since the driver's attention has to be diverted from traffic for only a short time.

To be able to notify the driver of, for example, an imminent hazardous situation in conjunction with the object as early and quickly as possible, information concerning a distance from the object may be displayed on the display unit in the display step, the information being displayed in an area of the image which represents the object. Such information may include, for example, an indication of an imminent collision with the object. In this case, for example, the information may be displayed as a symbol or special graphic together with the mark in the area of the image which represents the object.

According to another specific embodiment of the present invention, in the use step the driving route of the object may also be compared to a desired predefined route of the vehicle, the object no longer being used for determining the driving route to be traveled by the vehicle when the comparison has shown that the object has moved away from the desired predefined route by more than a predefined distance, and/or that in the use step the object is no longer used for determining the driving route to be traveled by the vehicle when a determined speed of the object is greater than an allowed speed at the position of the vehicle, and/or that in the use step the object is no longer used for determining at least one longitudinal control parameter for a driving route to be traveled by the vehicle when an ascertained distance of the object from the vehicle is greater than a predefined distance. Such a specific embodiment of the present invention offers the advantage that early recognition may be made that the object which is used as the basis for determining the driving route to be traveled, in particular which is being followed, is no longer suitable as such an object for assisting in the lane guidance of the host vehicle. In this case, the output of an error message, which could possibly irritate the driver and thus possibly result in a hazardous traffic situation, may be avoided.

DETAILED DESCRIPTION OF THE INVENTION

In the following description of preferred exemplary embodiments of the present invention, identical or similar reference numerals are used for the elements having a similar action which are illustrated in the various figures, and a repeated, description of these elements is dispensed with.

Figure 1:
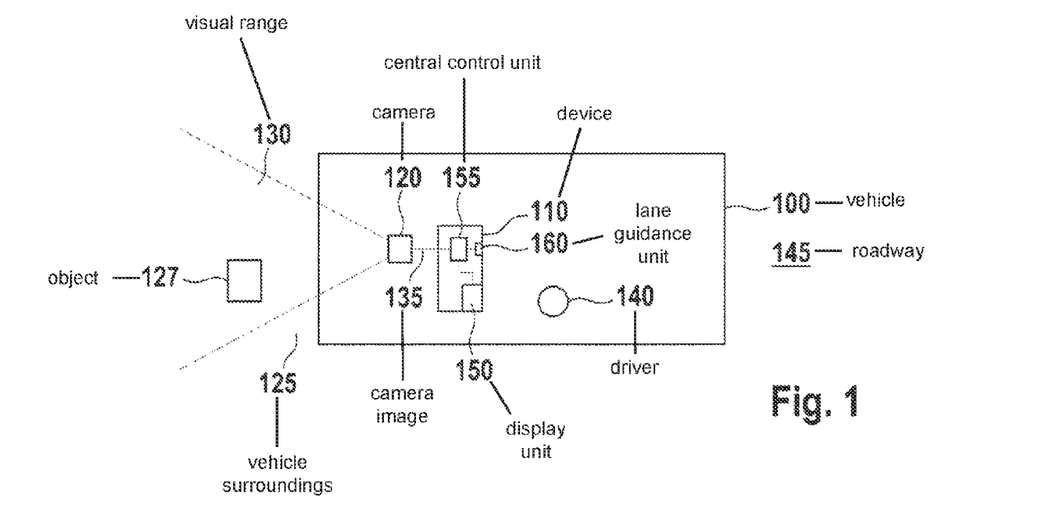
FIG. 1 shows a block diagram of a vehicle in which a device according to one exemplary embodiment of the present invention is used.

FIG. 1 shows a block diagram of a vehicle 100 in which a device 110 according to one exemplary embodiment of the present invention is used. In addition, the vehicle includes a camera 120 which detects the vehicle surroundings 125 together with an object 127 situated therein in a visual range 130, in particular ahead of the vehicle, and which transmits a corresponding image 135 to device 110 for assisting a driver 140 in lane guidance of vehicle 100 on a roadway 145. Device 110 includes a display unit 150 on which camera image 135 may be displayed. Display unit 150 contains a touch-sensitive screen, whereby driver 140 of the vehicle, by pressing with the finger on the screen, may select an object in camera image 135 which is to be used as the basis for determining the driving route to be traveled by the vehicle. A central control unit 155 may take over the function on the one hand of transmitting camera image 135 to display unit 150, and on the other hand of reading in the input from driver 140 via the touch-sensitive screen. In addition, a mark as a marking symbol or marking object may be selected in control unit 155 and superimposed on the area of camera image 135 which represents the selected object. The image which has been superimposed with the aid of the marks is subsequently transmitted back to display unit 150, where it is displayed to driver 140. At the same time, the marked object may be used in control unit 155 as the basis for determining the lane to be traveled by the vehicle, i.e., the driving route to be traveled by the vehicle, for example to carry out automatic tracking of this object, i.e., automatic longitudinal and/or transverse guidance of the vehicle, in a specialized lane guidance unit 160, or to transmit signals to driver 140 which provide driver 140 with instructions or information concerning how he may drive the vehicle in the quickest or most energy-conserving or convenient manner possible in a lane defined by the object. A "lane" is understood to mean a desired trajectory which the vehicle is to travel. This desired (travel) trajectory may on the one hand be, for example, a lane marked by roadway markings, and on the other hand this trajectory (for unmarked roadways, for example) may be a trajectory which is computed by a computer in the host vehicle and then output as the "lane" to be traveled. In this way, even for unmarked roadways a "lane" to be traveled by the host vehicle may still be obtained in order to allow the most efficient assistance possible to the driver in driving the vehicle. The "lane" to be traveled should be determined taking the object into account. In particular, a "lane" is determined on which the object is also traveling, so that it may be ensured that in determining the "lane" to be traveled or to be followed, the only trajectories that are considered are those which also have a reference to the object which is to be followed in the present case.

Figure 2:
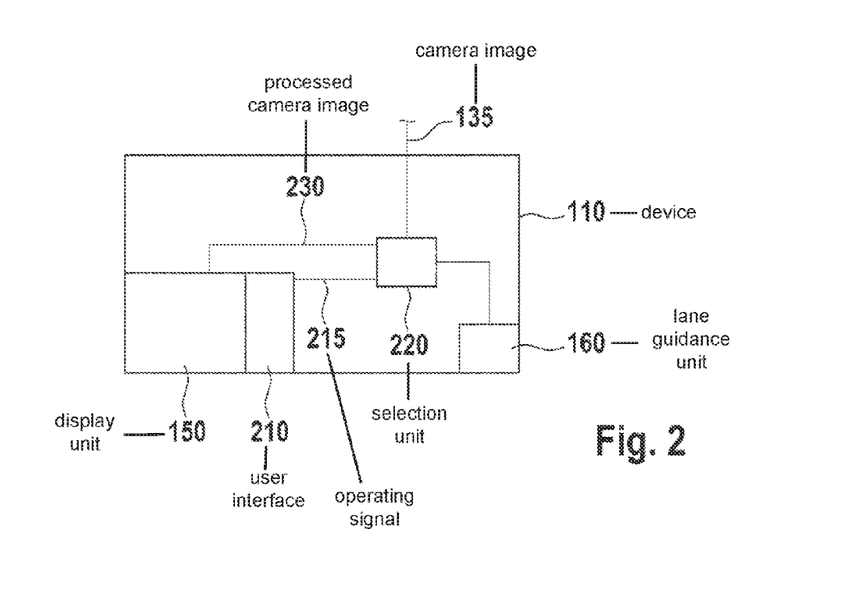
FIG. 2 shows a more detailed block diagram of a device for assisting the driver in lane guidance of a vehicle on a roadway from FIG. 1.

FIG. 2 shows a more detailed block diagram of a device 110 for assisting the driver in lane guidance of a vehicle on a roadway. Device 110 includes display unit 150 and a user interface 210 which is designed, for example, in the form of the touch-sensitive surface of the screen of display unit 150 or as a microphone for recognizing voice signals, and which provides an operating signal 215. The user interface may also be situated further from display unit 150, and formed, for example, by a joystick or a touchpad on the center console or by a transverse sensor in the gas pedal. In addition, device 110 includes a selection unit 220 which may be situated in central control unit 155 and which selects an object contained in the image in response to operating signal 215 and superimposes a corresponding mark on camera image 135 to obtain an appropriately processed camera image 230. In addition, selection unit 220 may transmit this camera image 230 with the superimposed mark back to display unit 150, on which this superimposed camera image 230 is then displayed. Furthermore, the device has above-mentioned lane guidance unit 160.

All driver assistance systems known thus far share the common feature that they provide the driver with very little information concerning the object detection by the sensors, and give the driver little or no opportunity for influencing, for example, which vehicle is to be tracked.

The present invention aims in particular to eliminate this shortcoming, and describes a driver assistance system which interacts with the driver in a manner not known thus far. For this purpose, the driver assistance system uses at least one camera for observing the vehicle surroundings (in particular ahead of the vehicle), and a screen for presenting the optionally processed camera image and possible additional information.

As the reason for dissatisfaction with their driver assistance systems, customers often state that many times the behavior of the system is not credible, and that there is a lack of transparency as to why the system behaves as it does. This is particularly true when the system behavior is significantly different from the behavior that is expected or preferred by the driver at that moment.

One reason for this shortcoming is the weakness of the sensors (for example, insufficient range during expressway travel at very high speed, too late detection of relevant merging vehicles, appearance of spurious objects). The method according to the present invention eliminates the shortcoming of system transparency, as well as the associated lack of influencing opportunities for the driver. The underlying basis is provided by a novel algorithm for video-based object tracking. This algorithm makes possible, among other things, a useful depiction of the object tracking in the video image, which is perceived by the driver as exact, stable, and reliable, and therefore high-quality.

The system presented in this description uses a screen (display) in order to display to the driver at any point in time the information regarding the driver assistance or the driving task which is important to the driver. The screen may also be formed by the windshield, in which case relevant information is overlaid on the windshield.

The image from a camera oriented in the driving direction is customarily displayed on this screen. This image is, for example, further enhanced with information that is of interest or importance to the driver. In addition, according to one exemplary embodiment, with the aid of the screen the driver is informed of his selection options which may be exercised by interacting with the system.

Additional information of the system concerning the other objects, for example vehicles, is fixedly connected to the object in the image, and appears to be "stuck" to the object, so to speak. The following system description is therefore based in particular on the capabilities of an algorithm which represents such object information together with an object, such an algorithm providing an important prerequisite for the practical implementability of the present invention.

The mode of operation of the present invention described here in one exemplary embodiment is based on data from at least one surroundings sensor (preferably video, alternatively range video (light travel time measurement), radar, LIDAR, ultrasound, or combinations thereof). These data pertain to

- in particular the longitudinal control of the host vehicle (i.e., the host vehicle in which the driver is sitting), and optionally also the transverse control, and/or
- an output of driving instructions which assist the driver in the task of longitudinal/transverse control.

The system according to the exemplary embodiment of the present invention is described in greater detail below with reference to the phases of object tracking. Embodiment variants are also discussed in places.

Phase 1: Object Selection

Figure 3:
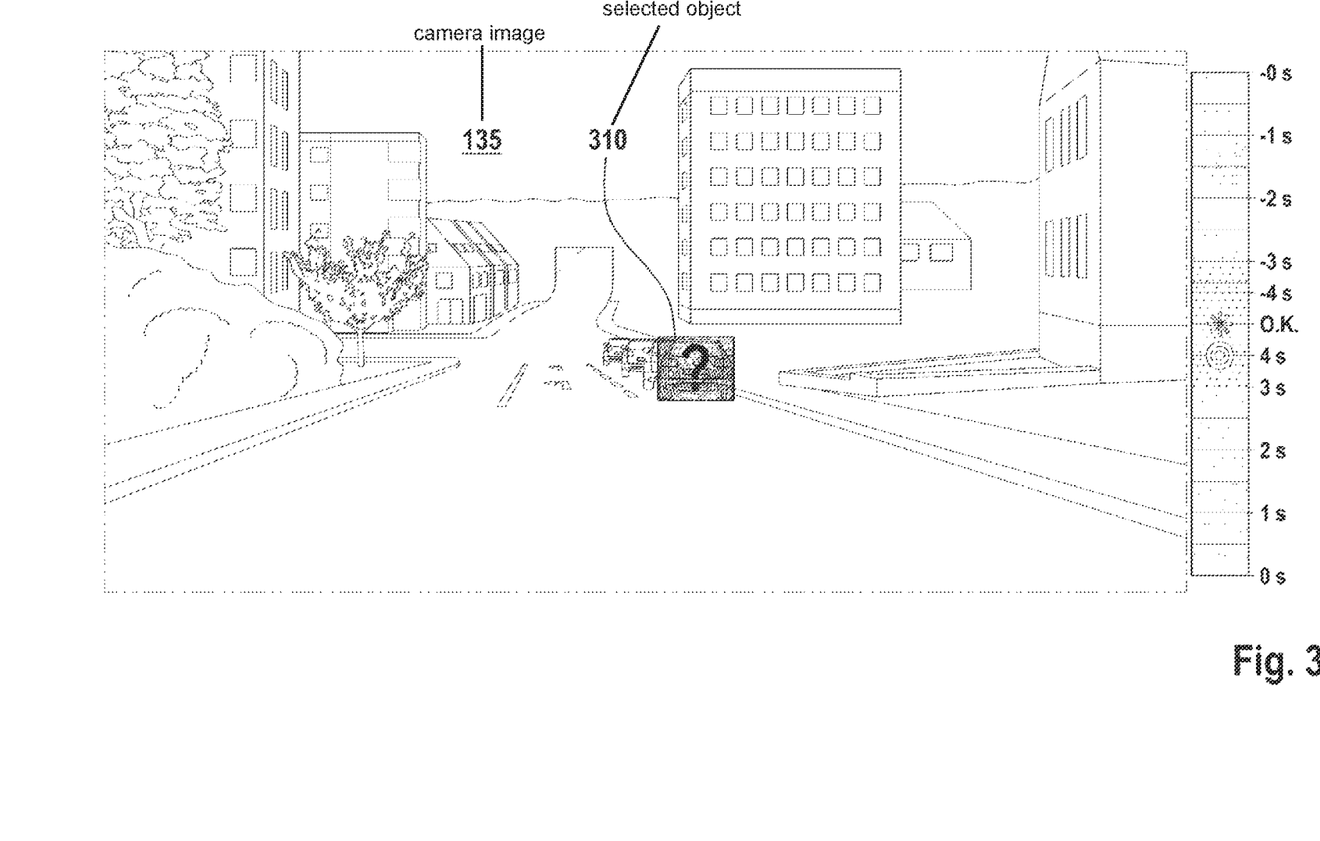
FIG. 3 shows an illustration of an image recorded by the camera of the vehicle.

The system may be operated with or without automatic object detection (selectively or depending on the availability of object detection):

- If no object detection is present or if it is not used, the driver may select the object himself. For this purpose, the driver touches with a finger, for example, the displayed object on the touch-sensitive display (touchscreen) which he intends to follow.
- For this purpose, the touchscreen should be situated at an appropriate location so that it is easy to touch using a finger. In this case, positioning behind the steering wheel would be less favorable.
- Alternatively, the display and the input element may be structurally separate. For example, the input element may have a design similar to a PC tablet or to a touchpad of a notebook PC, and may be situated on the center console or on the steering wheel or some other location that is easily accessible for the driver.
- After the driver has selected the object, for example by touching with the finger, an object tracking algorithm begins the tracking. At the same time, the object movement in the image, the change in size (scaling) of the image, and the object dimensions in the image are determined, for example using the AnyTrack algorithm by Bosch. It is thus possible to overlay additional information (i.e., a mark) on the image (in particular in the area of the object to be tracked) which has the correct size and which uses the ascertained movement and scaling data.
- In the simplest case, this additional information may be composed of an image which is unchangeable per se (but which is included in the movement and the scaling) as the mark, for example the image of a fingerprint. This image of the fingerprint then appears as if it were "stuck" to the vehicle.
- FIG. 3 shows an illustration of such an image recorded by the camera of the vehicle, one possible object 300 to be tracked already having been recognized on a lane for straight-ahead traffic, and premarked with a question mark for the selection. By the display of a question mark and the imaging of a fingerprint on object 300, the driver is thus given the option to start the automatic longitudinal guidance and optionally transverse guidance with respect to this target object. The driver accepts the option by pressing the finger on the touch-sensitive screen. A scale is plotted on the right side of the illustration in which a time period is entered which, with the speed at that moment remaining constant, would elapse until the vehicle would collide with the selected or marked object. When the driver of the vehicle selects this object, the question mark as a premarking is removed, and a fingerprint 310 as the mark of selected object 310 is superimposed on the camera image and displayed on the display unit, so that a display is depicted on a screen of the display unit according to FIG. 4. Thus, the question mark is no longer displayed after the driver confirms the target object. The fingerprint, which remains visible and fixedly connected to the target object, indicates and confirms to the driver that the longitudinal guidance and optionally transverse guidance relates to the vehicle which he has previously selected by touching with the finger. A color of the display of the fingerprint (as a mark) may be selected according to a predefined color scale, as explained in greater detail below. The color corresponds, for example, to the remaining time until a collision, and this establishes a correspondence with the urgency of the (braking) intervention. For example, deep red may require a "particularly urgent" necessary braking intervention by the driver.
- If a detection algorithm is present which has already independently detected the relevant object(s), this/these object(s) may be provided to the driver for selection or for confirmation. This takes place via a suitable visual representation in the display, for example by highlighting the object(s) and displaying, together with the particular object, a symbol which indicates to the driver that he has a selection option or that a confirmation is expected of him.
- In the simplest case, here as well an unchangeable image (but which is included in the movement and the scaling), for example the image of a fingerprint with a question mark, is used. The image symbol should be selected in such a way that, even for a driver who is inexperienced with the system, it is quickly and unmistakably clear that an input is expected from him in a certain way, in this case, for example, by pressing with the finger on the display.

The driver selects one of possibly multiple objects by pressing with the finger, and the tracking of this "target object" begins.

This means that from this point on, for example an automatically longitudinal control and/or transverse guidance with respect to the object is carried out, or that the driver receives assistance while driving the vehicle, for example in the form of acoustic, haptic, or visual signals, which prompt him to brake, accelerate, or steer.

A "snap to object" function for simplifying the input is particularly advantageous in the interactive object selection. It is acceptable for the input by the user to be imprecise, even slightly to the side of the object. The system assists the driver by automatically selecting the object that was most likely intended by the input. This function further shortens the time required for the input, and reduces the time necessary for glancing at the display.

Variants: Interface

As described above, a touchscreen is particularly well suited as the interface with the driver. However, the touchscreen should be used only when it is placed in such a way that it is safely possible to touch the screen while driving.

Alternatively, the screen and the touch-sensitive surface may be situated at other locations.

In this case a head-up display (HUD) is particularly preferred, in particular when it is suited for implementing a so-called contact analog display between a superimposed information overlay and the target object in question. For the driver, this could then have the appearance as shown, for example, in FIGS. 3 through 5 or FIG. 10, in this case the actual view through the windshield, not the grayscale image of the camera, being presented.

Alternatively, a screen (or HUD) and a touchscreen may be used at the same time. The screen (or HUD) is preferably situated in the preferred field of vision of the driver, for example in the instrument panel or above same, while the touchscreen is mounted to the side of the instrument panel and optionally at a different height.

In a touchscreen, an association between the point of contact and the image point is automatically provided. However, if the touch-sensitive surface and the display are structurally separate, there are various options for interpreting the point of contact:

On the one hand, the coordinates of the point of contact may be converted into an image point which continues to be proportional. The touch-sensitive surface then has the characteristics of a PC tablet as used by designers for input on a PC.

If there is a nonlinear and/or time-variable relationship between the point of contact and the image point, the characteristics are instead more like a touchpad as is known from notebook computers.

As an alternative to the touchscreen, in which actual contact is necessary for the input, a touchless sensor system is also possible, for example having a capacitive sensor surface, or having optical recognition of the position of the finger or hand in space, or having optical recognition of the viewing direction of the driver.

Alternatively, the input element may be a force sensor or a motion sensor which is touched and controlled by at least one finger. The number of degrees of freedom may depend on the function. For example, one degree of freedom to the left/right is sufficient for switching to the next provided object and pressing for selecting the object. When there are two degrees of freedom (additionally top/bottom), the entire image may already be controlled and the object selected strictly manually. Yet another degree of freedom (large/small in the image, equivalent to near/far under actual conditions) may be utilized to also select the distance range of the object.

Alternatively, the input element may be designed in such a way that it is touched or contacted by more than one finger. This is even more advisable the more degrees of freedom that are provided for the input.

Alternatively, the input element may have a design similar to a PC mouse, the input element being movable in multiple directions and being secured against slipping with the aid of suitable means, for example by magnetic means and with liquid damping.

Optionally or alternatively, foot control may be provided, for example with a foot pedal which is able to detect lateral forces or movements of the foot.

Optionally or alternatively, voice control may be provided. In this regard, the voice commands may be adapted to the detection capabilities of the system. Examples are as follows:

"Follow the red car!"
"Follow the license plate HI-ER 3771"
"Follow the Mercedes van!"
"Follow the truck!"
"Follow the car in front!"
"Follow the passenger car on the right!"

At least some of the options which result from the voice control may be displayed to the driver in the form of colors, text information, and/or image symbols in the display. For example, the recognized object color may be displayed or written as text, or the recognized make of a vehicle may be displayed as a logo or written as text, or the license plate may be written in a well-visible manner, or the objects may be denoted by symbols (passenger car, truck, van, mobile home, motorcycle, and the like).

It is also conceivable for the system to have not only voice input, but also voice output. Selection options may then be announced, similarly as for voice control for telephone banking or for automatic telephone schedule information, or specific questions may be asked, for example:

Do you want to follow the vehicle merging from the right?
Do you want to continue following the black vehicle?
Do you want to follow the vehicle that is turning?
Do you want to terminate tracking now?

Phase: Confirmation

As soon as the driver has made a selection or possibly even if he has failed to do so, in one advantageous embodiment the system provides feedback to the driver so that he is informed of the new system state. The meaningful content of the feedback will often be "The object selection is OK; the system is now tracking the selected object," but may also be "The system cannot perform the tracking," for example when the driver has provided unclear information, or when the system can find no object at the touched image position which could be tracked.

The confirmation may take place acoustically, for example via an acknowledgement tone or a voice announcement, for example "The preceding vehicle is now being tracked, taking the prevailing speed limit of 70 km/h into account."

The confirmation may also take place haptically, for example via brief vibration of the steering wheel or at the input interface which is still being contacted by the driver's hand at this point in time, or via vibration of some other element (a foot pedal or seat, for example) which the driver is able to perceive.

Figure 4:
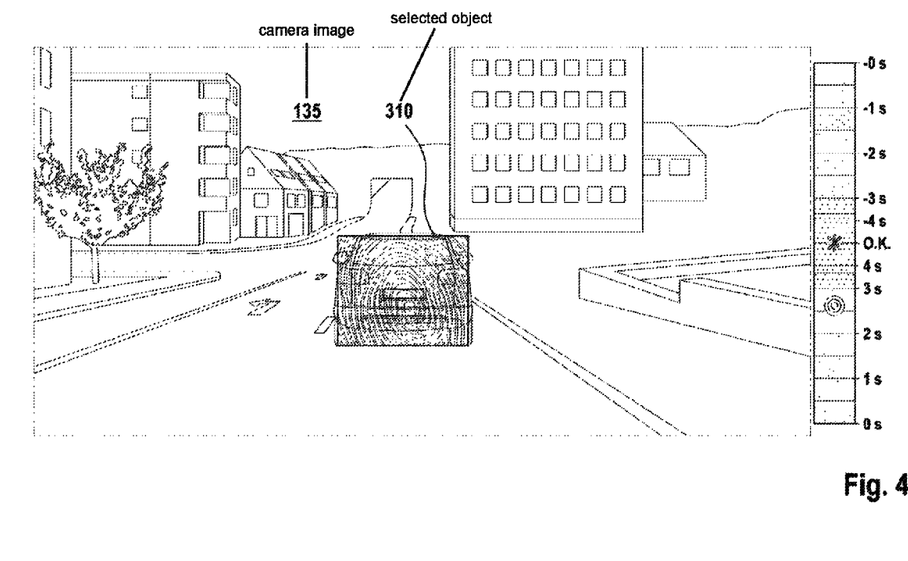
FIG. 4 shows another illustration of an image recorded by the camera of the vehicle, a mark being overlaid in the area in which the selected object is present in the camera image.

The signaling is generally also carried out visually, for example by the display representation changing and thus displaying a mark of the object that has been selected. For example, the above-described displayed question mark on the fingerprint would disappear and only the fingerprint (still "stuck" to the object) would remain, as illustrated in FIGS. 3 and 4.

Phase: Object Tracking

At the same time as the confirmation, the object tracking phase begins, which generally lasts, for example, until the target object selects a different direction or a different lane than the driver, or drives too fast or too slowly.

In the object tracking phase, the display may be utilized for displaying to the driver useful or at least interesting additional information which relates to the object (and of course, also information which is not directly related to the object, such as information concerning currently applicable traffic signs, navigation instructions, and the like).

Even a simple, continuous visual identification of the object in the image may be interesting and useful for the driver. The driver is provided with confirmation that the system is still operating correctly and has not lost the target object. In addition, precise tracking in the image conveys a sense of the quality of the measurement, which is important for trust in the system and the perception of value.

The depiction of the object may be enhanced as desired, for example using animated graphics, colored highlighting, numbers and text, and scales and measuring indicators, and the like. Esthetics or communication of information may be the main emphasis in the design.

Figure 5:
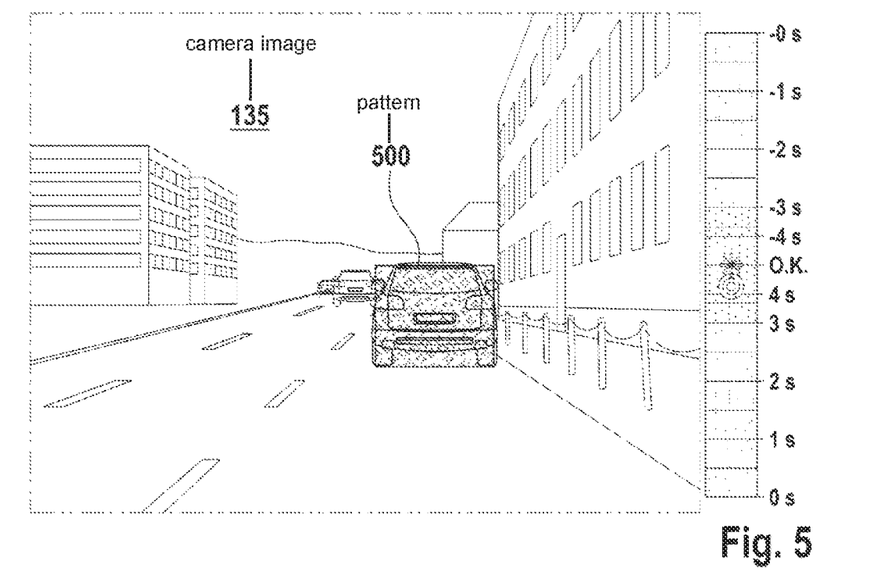
FIG. 5 shows an object together with a mark or additional information in a camera image.

FIG. 5 depicts such a representation of an object using additional information. This involves an object which is automatically selected by the system. Therefore, instead of the fingerprint a different symbol, in the present case a pattern 500, is represented as a mark in superimposed form. However, it is also conceivable for an object that is selected by the driver to be provided with a mark as well as at least one additional piece of information, and displayed.

The determination of the time until a collision with the object (time to collision, also referred to below as TTC or $T_{TC}$ for short) is described in greater detail below.

The so-called time to collision ($T_{TC}$), i.e., the remaining time until a collision with the object would occur (for example, with continuation of the driving situation at the moment) is of particular interest for visual distance control.

Ascertainment of the $T_{TC}$ and approaches for its camera-based determination are described in greater detail below, including the visual or camera-based determination and the discussion of typical driving situations.

In determining the $T_{TC}$, a prediction may be included which assumes either that the instantaneous driving state is maintained until the time of collision, or that the foreseeable new driving states are also incorporated.

The variables used for the prediction may include the following:

scaling s of the object dimensions between two images (for example, the distance in the image from two points on the object);

the host vehicle speed and variables derived therefrom.

The $T_{TC}$ described below relates to the time of the collision with the object (more precisely, with the points observed on the object), using the camera. For practical use, however, the time of the collision with the front end of the host vehicle is of interest.

A simplified scenario having a constant differential speed $v = v_{host\ vehicle} - v_{object}$ between the host vehicle and a collision-relevant object is considered. A negative differential speed means that the objects are moving toward one another. The instantaneous distance is d. The time until the collision is then $$T_{TC} = -\frac{d}{v}.$$

A camera connected to the host vehicle tracks two points on the object whose distance from one another parallel to the camera plane is W. Thus, a distance $$w = \frac{Wf}{d}$$

results in the image of the camera according to the pinhole camera model, with a focal distance f.

In contrast, at the point in time which is earlier by time difference T, the following applies:

$$w_p = \frac{Wf}{d - vT}.$$

If $$s = \frac{w}{w_p}$$

is defined as the scaling factor between the differently sized images having distance W, the following results:

$$s = \frac{w}{w_p} = \frac{d - vT}{d} = 1 - \frac{v}{d}T = 1 + \frac{T}{T_{TC}}$$

or $$T_{TC} = \frac{T}{s - 1}.$$

Several typical situations are considered below.

When the host vehicle is following another vehicle with the distance constant, the image size remains unchanged, and $w = w_p$ or $s = 1$ applies. Thus, the time until a collision is infinite: $T_{TC} = \infty$. A longitudinal controller, which controls the acceleration and braking, for driving while following behind an object will thus attempt to reach this point $T_{TC} = \infty$.

For an approximation of an object, $w > w_p$ or $s > 1$ applies. Accordingly, the $T_{TC}$ has a positive value. In a numerical example, for an image period of T=40 ms and distances of w=102 pixels and $w_p$=100 pixels, this results in $T_{TC}$=2.0 s.

If the object, for example a passing vehicle, moves farther away, w<$w_p$ or s<1 applies, and the $T_{TC}$ has a negative value.

At the time of the collision or immediately prior to or after same, $T_{TC}$=0, and scaling factor s approaches +∞ or −∞.

With knowledge of host vehicle speed $v_{host\ vehicle}$, the $T_{TCcam}$ with regard to the camera may be converted into a $T_{TCfront}$ with regard to the front end of the vehicle (the bumper, for example): $T_{TCfront}=T_{TCcam}-l/v_{host\ vehicle}$. Length l is the distance between the camera and the front end of the vehicle in the longitudinal direction (driving direction). As an example, for l=2 m and $v_{host\ vehicle}$=20 m/s, $T_{TCfront}$ is less than $T_{TCcam}$ by 0.1 S.

This computation represents a simplification, since it disregards speed $v_{obj}$ of the object. Since in the considered scenario of the forward travel of the host vehicle, the absolute value of the host vehicle speed, apart from the backward travel of the vehicle ahead, is always greater than the differential speed, the simplification is a conservative estimate: thus, the $T_{TCfront}$ determined in this way is generally slightly less than the actual $T_{TC}$.

Of course, it is also possible to use differential speed $v_{diff}$, if it is available, instead of host vehicle speed $v_{host\ vehicle}$.

In any case, it is meaningful to operate using the $T_{TCfront}$, possibly even using a $T_{TC}$ which relates to a plane which is even prior to the front end of the vehicle (safety margin).

Even further variables may be included in the determination of the TTC, such as the host vehicle acceleration (for example, measured by an acceleration sensor or derived from the speed or derived from the engine/braking demand on the basis of a model).

When the host vehicle acceleration is included in the determination of the TTC, the response of the $T_{TC}$ computed in this way is generally more dynamic.

This greater dynamic response provides the advantage for the driver that he receives feedback more quickly concerning the host vehicle acceleration or deceleration. The driver is thus informed more directly concerning the effects of an automatic (or also manual) intervention in the longitudinal control.

Further function-relevant variables which have an influence on the TTC are the following:

The system state of the braking system (for reducing the effect of dead times), for example whether braking has already been initiated which has effects on the $T_{TC}$ after buildup of the brake pressure.

Further sensor data, for example from yaw rate sensors, steering angle sensors, single wheel sensors, or spring travel sensors, via which it may be recognized that an evasive maneuver has been initiated which may possibly prevent a collision.

Of course, measuring data from further surroundings sensors may be taken into account, for example radar sensors (measurement of speed and distance), LIDAR sensors (measurement of the distance with the aid of light travel time), stereo cameras (measurement of a plurality of distances with the aid of triangulation), range cameras (measurement of a plurality of distances with the aid of light travel time), or ultrasonic sensors (measurement of the distance with the aid of the propagation time of sound).

Figure 6:
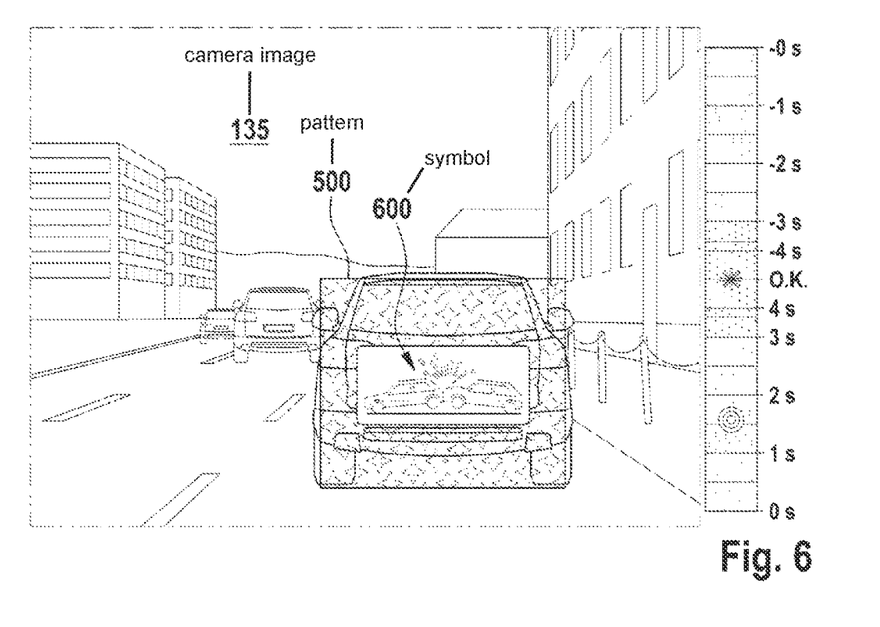
FIG. 6 shows another illustration of an object together with a mark or additional information in a camera image.

To provide a driver with information concerning an imminent collision as early as possible, the mark which is represented in the area of the object in the image may be changed over time. For example, according to FIG. 6, the driver is warned when the system has established that the time until a collision is only 1.6 seconds. In particular when the longitudinal control is not automatic, but instead is carried out by the driver, it is meaningful to warn the driver prior to a possible collision. In this case, the visual (and optionally the acoustic/haptic) warning takes place as soon as the $T_{TC}$ is less than approximately 2.0 seconds. This temporal warning threshold is selected in such a way to allow the driver [to] still [have] enough time to react, brake his vehicle, and thus prevent the imminent collision. In such a case, for example, a symbol 600 of two colliding vehicles may be overlaid in the area of the object as additional information.

Figure 7A:
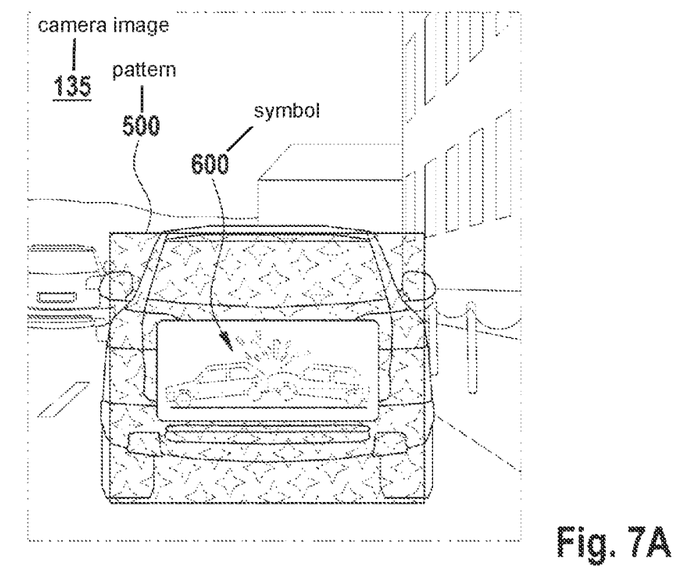
FIGS. 7A and 7B show illustrations of the object together with additional information in the camera image at different points in time.
Figure 7B:
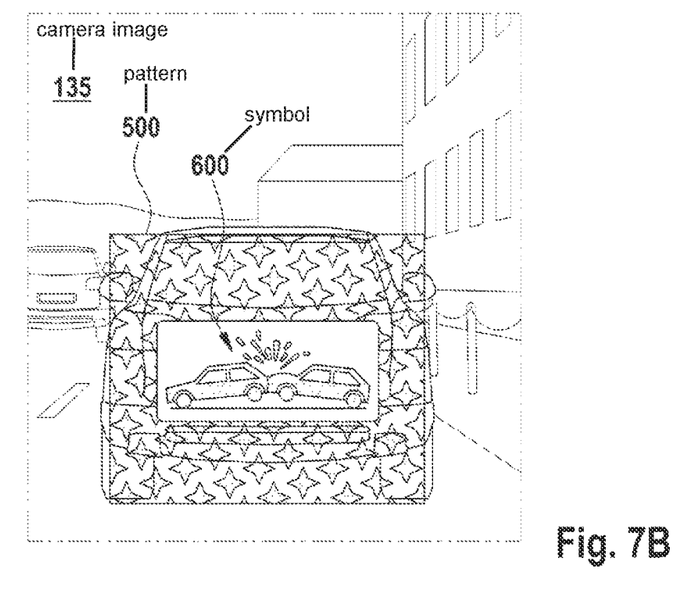

The perceptibility of the visual warning and the rapid, correct spatial detection may be further improved when the visual warning pulses over time, for example with a frequency of two to five pulse periods per second, as illustrated in FIGS. 7A and 7B, FIG. 7B representing an illustration of the image having the mark and additional information in a time interval of 0.2 s, for example, after the illustration according to FIG. 7A. For example, the intensity and the magnitude of the colored superimposition may vary over time, for example in a sinusoidal, sawtooth-shaped, or rectangular manner. The display thus pulses between a weak and a stronger intensity, as shown here based on two snapshots. It is advantageous to select the pulse amplitude and/or the frequency as a function of the $T_{TC}$ in such a way, for example, that these values further increase with increasing danger.

Figure 8:
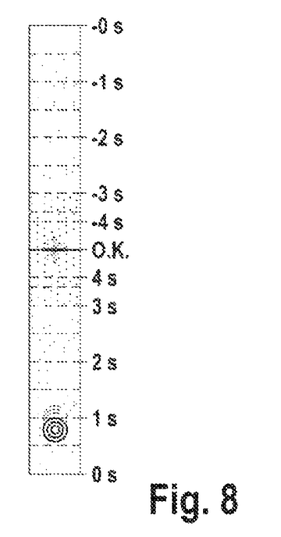
FIG. 8 shows an illustration of a depiction of the time until a collision with an object, in a bar chart.
Figure 9:
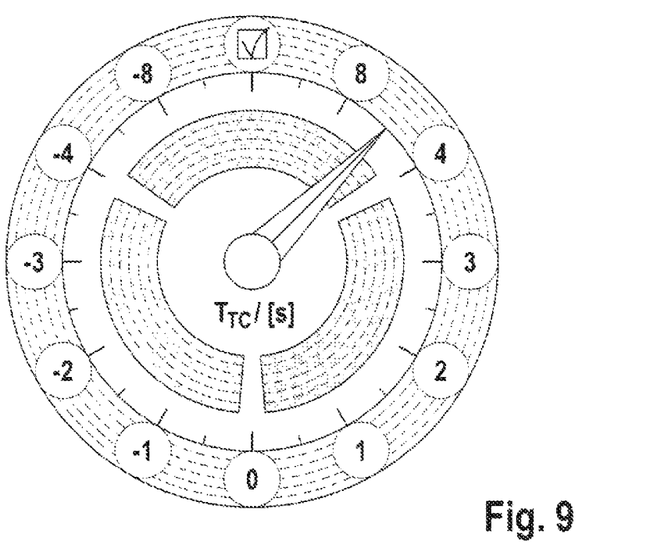
FIG. 9 shows an illustration of a depiction of the time until a collision with an object, in the form of a circular dial.

It may be advantageous to also visually display the TTC to the driver. Possible display variants are shown in FIG. 8 and FIG. 9. FIG. 8 shows an illustration of one possible depiction of the TTC in the form of a bar chart. FIG. 9 illustrates the depiction of the TTC in the form of a circular dial. The "infinity point" (setpoint) is present at the top of the scale.

When the host vehicle is following another vehicle with the distance constant, $T_{TC}$=∞. This ideal point is the aim of an adaptive cruise control (ACC) system as well as of a human driver. The ideal point is denoted in FIG. 8 by "O.K." and a star, and represents the setpoint state. In the lower dark area the $T_{TC}$ is positive; i.e., the collision has yet to occur. In the very dark area illustrated at the very bottom (approximately 2 s to ∞), an urgent braking intervention is necessary. The black and white rings (at approximately $T_{TC}$=0.8 s) denote the instantaneous actual state, and the floating rings behind same denote a short-term history. The $T_{TC}$ is <0 in the green to blue area, which means that the distance from the vehicle ahead has just increased.

The area between $T_{TC}$=−3 s and $T_{TC}$=+3 s has been intentionally nonlinearly compressed here, since control interventions are usually not necessary in this area. In contrast, for reasons of energy efficiency and driving comfort it is generally more meaningful not to directly follow the changes of the vehicle ahead, but instead to allow the longitudinal distance to be slightly varied until the next intervention. The $T_{TC}$ area in which interventions have not yet been made should change with the host vehicle speed.

In other respects, the points −0 s and +0 s are identical, and therefore the actual cyclical scale may also be represented as such (or may be sectioned at some other location).

In FIG. 9 this circumstance is taken into account by representing the $T_{TC}$ on a circular dial. The colors here denote three sectors: blue stands for "Keep driving," red stands for "Brake," and green stands for correct distance control while following another vehicle.

Figure 10:
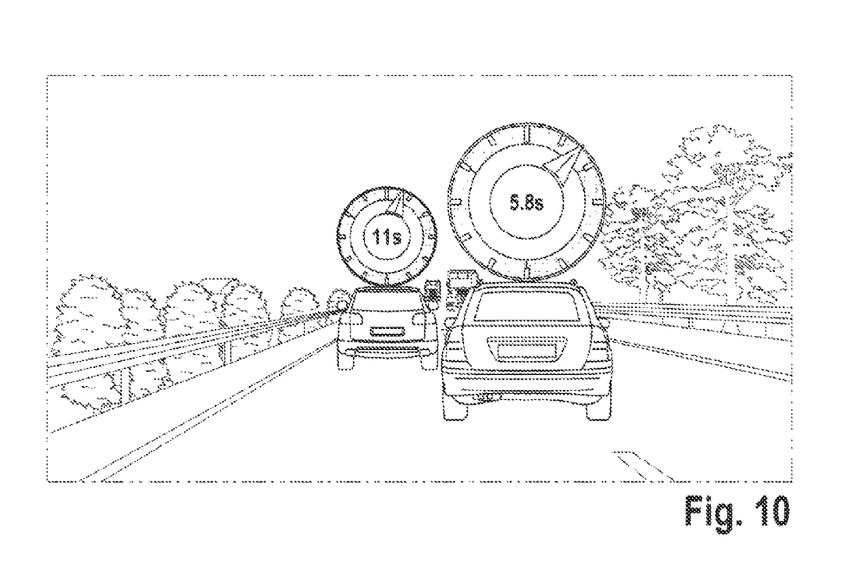
FIG. 10 shows an illustration of the overlaying of times until a collision with various objects, in the form of circular dials which are overlaid in the area of the particular objects in the camera image.

FIG. 10 shows a design in which one or multiple $T_{TC}$ tachometers may be overlaid in the camera image, which is displayed to the driver. Here, the $T_{TC}$ tachometer moves as if it were rigidly connected to the particular object, and is scaled as a function of its size in the image.

Influencing During Tracking

It is advantageous to provide the driver with options for influencing during the object tracking. The driver should at least have the option for influencing the longitudinal distance according to his intent. For this purpose, an entry option is provided via which commands such as "Decrease distance" and
"Increase distance"

may be given, optionally also with influencing of the extent of the change.

The interaction options described above may be used for this purpose.

In addition, it is meaningful to provide the driver with options for influencing the extent of the above-described behavior regarding energy efficiency and driving comfort versus energy use and "liveliness/sportiness."

Adaptation to Driver Intent

If the driver has an option for influencing the system behavior and makes use of it, the system has the opportunity to learn the driver's (long-term and short-term) preferences. The system is advantageously able to adapt to these preferences and make use of the changed parameters for future control operations.

Semiautomatic ACC System (Driver in the Loop)

One possible embodiment is semiautomatic control in which the driver is incorporated into the control loop. Thus, the driver continues to operate the gas pedal and brake, and also the gear shifting, if present. The defaults for their activation are transmitted to the driver by the system. This may take place according to a depiction as in FIG. 8, FIG. 9, FIG. 10, or in a similar way.

However, acoustic or haptic transmission is even more advantageous. Acoustic signals, for example, are output, and on the basis of their sound and intensity the driver concludes whether and to what extent the vehicle should be decelerated or accelerated. To avoid unnecessary stress, at least the prompting for acceleration, for example, should automatically end after a certain amount of time, even if the driver does not follow the prompting.

Such a semiautomatic system has the advantage that it may be retrofitted without electronic or mechanical interventions in the vehicle. This system is therefore also conceivable in a mobile device which, as is currently done for mobile navigation or cell phone navigation, is mounted on the windshield or the dashboard. It is only necessary to ensure that the camera has the most unobstructed view possible toward the front.

Taking Multiple Objects into Account at the Same Time

If the system is able to track multiple objects at the same time, it may be advantageous to take these objects into account simultaneously with the distance control. This is meaningful, for example, when the first target object and the host vehicle are situated on the right lane of an expressway, while the target object passes another object to the right. In this case, it is meaningful to further track both target objects, at least temporarily, and to not likewise pass the second target object to the right in order to avoid a hazardous situation and possibly comply with regulatory requirements.

Display of the Object on a Tachometer

Figure 11:
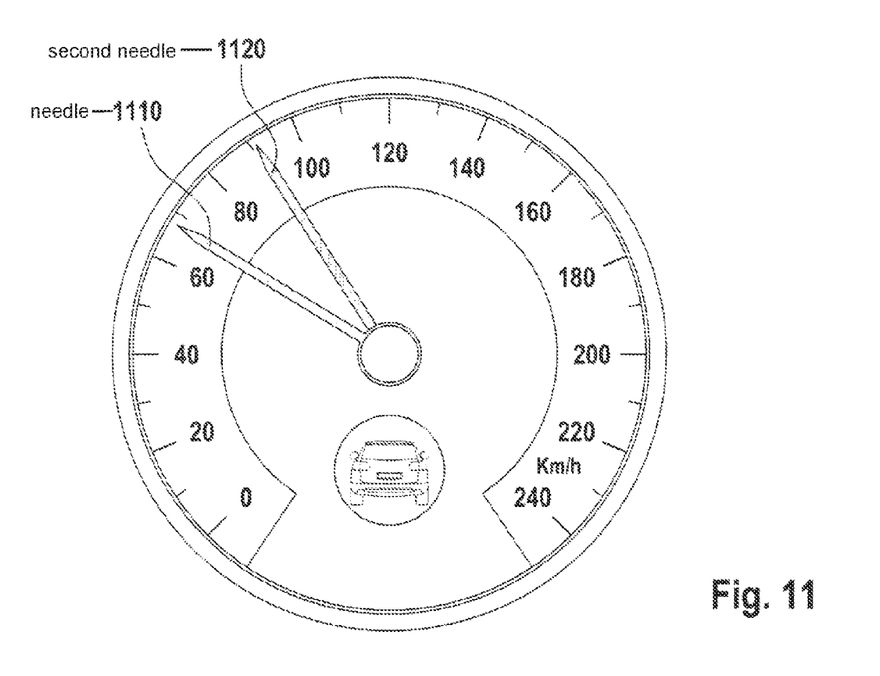
FIG. 11 shows an illustration of the overlaying of speeds of the host vehicle and of another vehicle on the same circular dial.

FIG. 11 shows one advantageous embodiment for a portion of the display in the instrument panel. The tachometer is shown here, and in addition to needle 1110 for the speed of the host vehicle (light) it has a second needle 1120 (dark). The tracked object is overlaid in the tachometer. If an object is being tracked, dark needle 1120 indicates the speed of the object, which may be ascertained using $v_{obj} = v_{host\ vehicle} - v_{diff}$, where $v_{diff}$ is the differential speed, which is determinable by sensor.

As a special feature, the image of the tracked object is additionally overlaid in FIG. 11. This may take place within the tachometer instrument, or also outside the tachometer at a suitable location. The image of the object is obtained by cropping from the camera image. Due to the video-based object tracking, all necessary information (object position and object size in the image) is always present in order to correctly carry out the cropping.

The update rate for the image of the tracked object may be selected to be identical to the image refresh rate of the camera (for example, 25 images per second), or may also be different from same. A significantly lower update rate (for example, 1 image per second) may already be sufficient, since the appearance of the object generally hardly changes. In contrast, a high update rate has the advantage that light signals (brake lights/turn signal lights) are directly depicted.

In this regard, the use of time filtering and/or a virtually expanded camera detection range (also see FIG. 12) is also advantageous.

Figure 12:
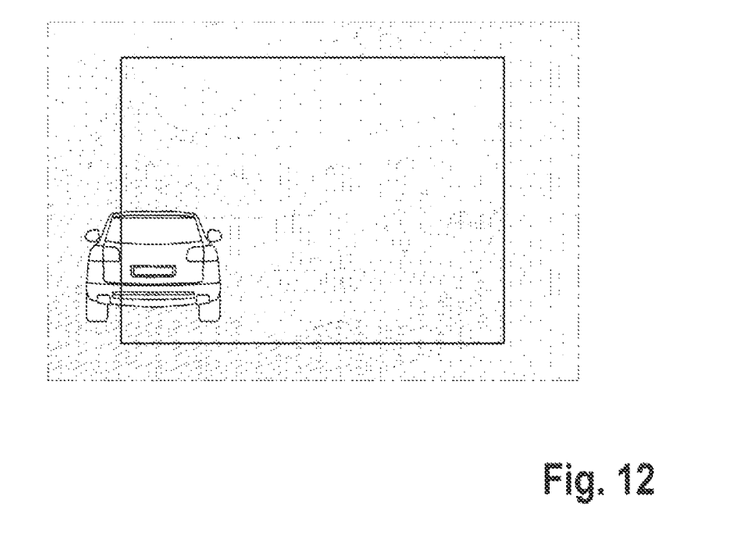
FIG. 12 shows an illustration of a camera image which allows a tracked object to be extracted from the image.

FIG. 12 shows an illustration of how a tracked object may be extracted from a camera image; the approach for extraction is not discussed further in the present description.

Time filtering takes into account the data of the object tracking. The object is thus imaged sharply, while the background, which is moved differently, "floats" in a blurred manner. In addition, the object may still be completely displayed, even if it may be only partially detected by the camera, for example in tight curves or due to being covered by the hood of the host vehicle. FIG. 12 shows a typical example: The object automatically "peels away" from the blurred background, and the virtual detection range (overall image) is larger than the detection range of the camera (white rectangular inner frame).

Phase: Termination of the Object Tracking

The tracking of a certain object must be terminated whenever the object has traveled faster and moved away,
has moved to another lane or turned,
has laterally moved out of the image (tight curve),
is being passed and is no longer detected by the camera,
is concealed by another object (a merging vehicle, for example) or obstacle.

In one advantageous embodiment, the system takes navigation information into account, and as a termination criterion recognizes that the object has selected a different route than that planned by the host vehicle.

In addition, a termination criterion is present, for example, when the tracking of the object would result in the host vehicle having to leave the desired or legally prescribed speed range. Of course, the driver may likewise terminate the object tracking by overriding the accelerator, brake, or possibly steering.

As soon as a termination criterion is met, or even when the imminent termination is foreseeable, the driver should once again be visually, acoustically, and/or haptically informed, similarly as for the start of the object tracking. The system subsequently returns to the state in which user interaction is necessary to select the next target object.

Alternatively, the system may also select the most suitable object for further tracking completely automatically. The degree of this suitability may depend, for example, on which lane the object is in, and the (relative) speed at which it is moving.

Figure 13:
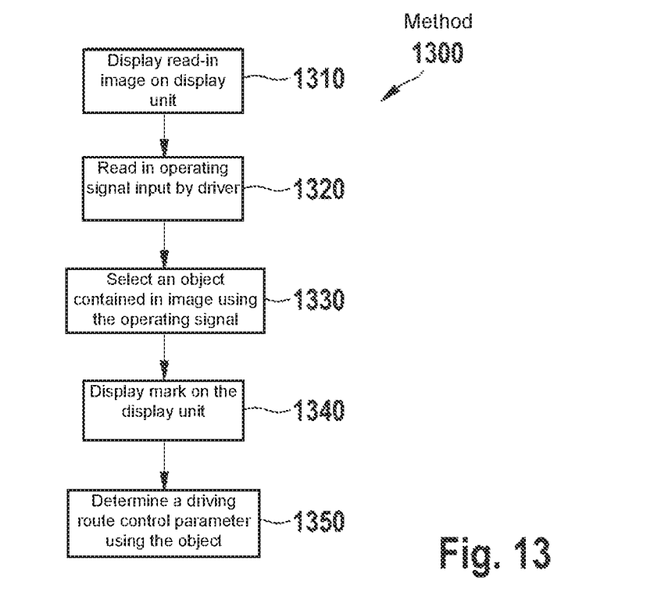
FIG. 13 shows a flow chart of a method according to one exemplary embodiment of the present invention.

FIG. 13 shows a flow chart of one exemplary embodiment of the present invention as a method 1300 for assisting a driver in lane guidance of a vehicle on a roadway. Method 1300 includes a step of displaying 1310 to the driver a read-in image on a display unit, the image having been recorded by a camera and representing the vehicle surroundings. In addition, method 1300 includes a step of reading in 1320 an operating signal which has been input on a user interface by the driver, and a step of selecting 1330 an object contained in the image, using the operating signal. Furthermore, method 1300 includes a step of displaying 1340 a mark on the display unit, the mark being displayed in an area of the image which represents the object. Lastly, the method includes a step of using 1350 the object for determining at least one longitudinal control parameter for a driving route to be traveled by the vehicle in order to assist the driver in lane guidance of the vehicle on the roadway.

The exemplary embodiments described and shown in the figures are selected only as examples. Different exemplary embodiments may be combined with one another, either completely or with respect to individual features. In addition, one exemplary embodiment may be supplemented by features of another exemplary embodiment.

Furthermore, method steps according to the present invention may be repeated, and carried out in a sequence different from that described.

If an exemplary embodiment includes an "and/or" linkage between a first feature and a second feature, this may be construed in such a way that according to one specific embodiment, the exemplary embodiment has the first feature as well as the second feature, and according to another specific embodiment, the exemplary embodiment either has only the first feature or only the second feature.

What is claimed is:

1. A method for assisting a driver in lane guidance of a host vehicle on a roadway, comprising:
displaying on a display unit a recorded image to the driver, the image having been recorded by a camera and representing the vehicle surroundings;
reading in an operating signal which is input on a user interface by the driver;
selecting, using the operating signal, an object contained in the image;
displaying at least one marking object on the display unit, wherein the at least one marking object (i) is displayed by superimposing the at least one marking object on an area of the image which represents the object and (ii) includes information representing a time to collision with the object; and
using the object to determine at least one longitudinal control parameter for a driving route to be traveled by the vehicle in order to assist the driver in lane guidance of the vehicle on the roadway;
wherein in the display step, information concerning a distance between the host vehicle and the object is additionally displayed on the display unit, the information being displayed in an area of the image which contains the object,
wherein the information is displayed as a symbol or a special graphic together with the at least one marking object in the area of the image which represents the object,
wherein a premarking on the object is touch selectable by the driver to provide a selected object to start at least one of a longitudinal guidance and a transverse guidance with respect to the object, and
wherein the premarking is removed when the object is selected and is replaced by a confirming marking, which confirms that guidance is being provided with respect to the selected object.

2. The method as recited in claim 1, wherein an early recognition of multiple objects in the image is carried out in the step of displaying the recorded image, and wherein one of the multiple objects recognized in the early recognition process is selected in the selection step using the operating signal.

3. The method as recited in claim 2, wherein the recorded image is displayed on a touch-sensitive display of the display unit in the display step, and the operating signal is generated in the reading-in step in response to a recognized pressing on the touch-sensitive display.

4. The method as recited in claim 2, wherein the operating signal is generated in the reading-in step in response to a recognized finger gesture of the driver.

5. The method as recited in claim 3, wherein in the selection step an object which is recognized in the early recognition process in the image is selected which is closest to a position in the image corresponding to a recognized pressing on the touch-sensitive display.

6. The method as recited in claim 2, wherein in the reading-in step a user interface is used which generates the operating signal by evaluating a voice command by the driver of the vehicle.

7. The method as recited in claim 2, wherein in the selecting step, an object is selected which represents another vehicle situated on the roadway one of ahead or to the side of the host vehicle.

8. The method as recited in claim 2, wherein in the display step, the at least one marking object is displayed by a representation which varies over time.

9. The method as recited in claim 2, wherein in the display step, information concerning a distance between the host vehicle and the object is additionally displayed on the display unit, the information being displayed in an area of the image which contains the object.

10. The method as recited in claim 1, wherein the use of the object to determine the longitudinal control parameter is stopped when at least one of: (i) a comparison of the driving route of the object to a desired route of the vehicle indicates that the object has moved away from the desired route by more than a predefined distance; (ii) an ascertained speed of the object is greater than a predetermined allowed speed at the position of the vehicle; and (iii) an ascertained distance of the object from the vehicle is greater than a predefined threshold distance.

11. A device for assisting a driver in lane guidance of a host vehicle on a roadway, comprising:
a display unit for displaying a recorded image to the driver, the image having been recorded by a camera and representing the vehicle surroundings;
a user interface for reading in an operating signal which is input by the driver;
a selecting arrangement to select, using the operating signal, an object contained in the image;
a displaying arrangement to display at least one marking object on the display unit, wherein the at least one marking object (i) is displayed by superimposing the at least one marking object on an area of the image which represents the object and (ii) includes information representing a time to collision with the object; and
a determining arrangement, using the object, to determine at least one longitudinal control parameter for a driving route to be traveled by the vehicle to assist the driver in lane guidance of the vehicle on the roadway;

wherein in the display step, information concerning a distance between the host vehicle and the object is additionally displayed on the display unit, the information being displayed in an area of the image which contains the object, wherein the information is displayed as a symbol or a special graphic together with the at least one marking object in the area of the image which represents the object, wherein a premarking on the object is touch selectable by the driver to provide a selected object to start at least one of a longitudinal guidance and a transverse guidance with respect to the object, and wherein the premarking is removed when the object is selected and is replaced by a confirming marking, which confirms that guidance is being provided with respect to the selected object.

12. A non-transitory computer-readable data storage medium storing a computer program, which is executable by a processor, comprising:

a program code arrangement having program code for assisting a driver in lane guidance of a host vehicle on a roadway, by performing the following:

displaying on a display unit a recorded image to the driver, the image having been recorded by a camera and representing the vehicle surroundings;

reading in an operating signal which is input on a user interface by the driver;

selecting, using the operating signal, an object contained in the image;

displaying at least one marking object on the display unit, wherein the at least one marking object (i) is displayed by superimposing the at least one marking object on an area of the image which represents the object and (ii) includes information representing a time to collision with the object; and using the object to determine at least one longitudinal control parameter for a driving route to be traveled by the vehicle to assist the driver in lane guidance of the vehicle on the roadway;

wherein in the display step, information concerning a distance between the host vehicle and the object is additionally displayed on the display unit, the information being displayed in an area of the image which contains the object, wherein the information is displayed as a symbol or a special graphic together with the at least one marking object in the area of the image which represents the object, wherein a premarking on the object is touch selectable by the driver to provide a selected object to start at least one of a longitudinal guidance and a transverse guidance with respect to the object, and wherein the premarking is removed when the object is selected and is replaced by a confirming marking, which confirms that guidance is being provided with respect to the selected object.

\* \* \* \* \*